March 12, 1957 — R. E. CURRAN — 2,784,428
METHOD OF MAKING A LOCK NUT ASSEMBLY FROM
A PLURALITY OF SHEET METAL LAMINATIONS
Filed Feb. 9, 1955

Russell E. Curran
INVENTOR.

BY Robert H. Wendt
Attorney

United States Patent Office 2,784,428
Patented Mar. 12, 1957

2,784,428

METHOD OF MAKING A LOCK NUT ASSEMBLY FROM A PLURALITY OF SHEET METAL LAMINATIONS

Russell E. Curran, Chicago, Ill.

Application February 9, 1955, Serial No. 487,109

1 Claim. (Cl. 10—86)

The present invention relates to improvements in lock nut assemblies, and is particularly concerned with the provision of an improved lock nut assembly of the type covered by my prior patent, No. 2,696,236, issued December 7, 1954.

One of the objects of the invention is an improved commercial embodiment of the lock nut covered by my prior patent, which is capable of cheaper manufacture, which has all of its parts enclosed against loosening, which may have its parts made by stamping with a punch press, and which is operative by means of a screw driver or other tool.

Another object of the invention is the provision of an improved lock nut construction in which the threads and lock nut are enclosed and protected against the weather so that corrosion is avoided, and the lock nut may be released at any time with a minimum amount of labor, and it may be used over and over again.

Another object of the invention is the provision of an improved lock nut construction which is so constructed that it cannot be released except by persons having knowledge of its characteristics and of its mode of release, so that unauthorized persons cannot readily unlock the lock nut.

Another object of the invention is the provision of an improved lock nut assembly which is sturdy, simple in construction, which has a minimum number of parts, and which may be manufactured at a low cost.

Another object of the invention is the provision of an improved lock nut assembly in which the nut or threaded member cooperating with the bolt is locked in place by means of opposite threads, such as for example, left-hand threads, when the bolt has right-hand threads.

Other objects and advantages of the invention will be apparent from the following description and the accompanying drawings, in which similar characters of reference indicate similar parts throughout the several views.

Referring to the single sheet of drawings accompanying the specification.

Figure 1:
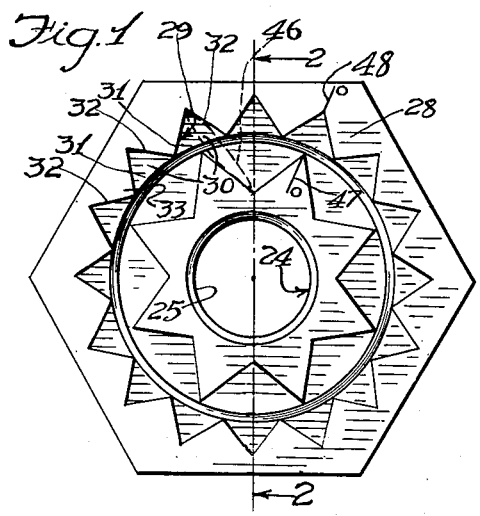
Fig. 1 is a plan view of the lock nut assembly taken from the left of Fig. 2.
Figure 2:
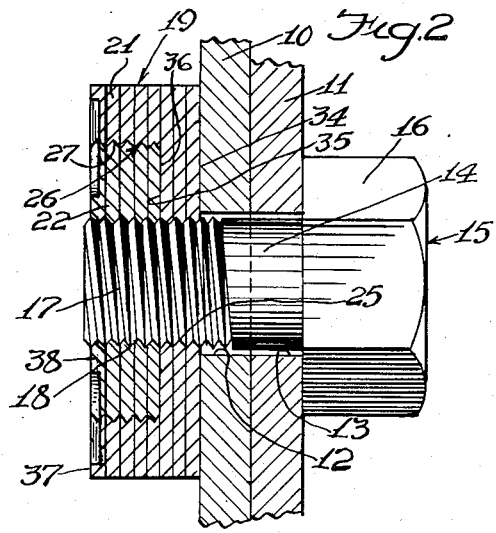
Fig. 2 is a sectional view taken on a plane passing through the axis, such as the plane of the line 2—2 of Fig. 1.
Figure 3:
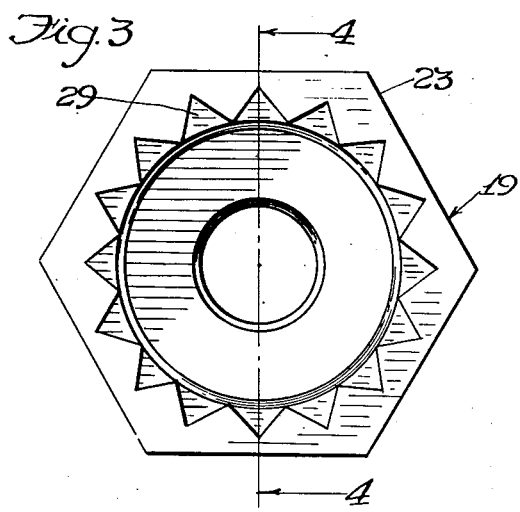
Fig. 3 is a view similar to Fig. 1, showing only the outer nut.
Figure 4:
Fig. 4 is a sectional view taken on the plane of the line 4—4 of Fig. 3.
Figure 5:
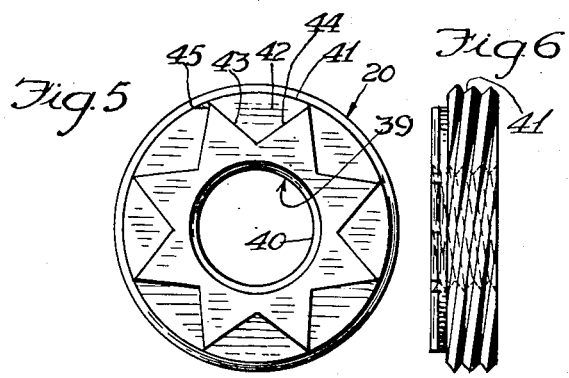
Fig. 5 is a view similar to Fig. 1 of the inside or smaller nut.
Figure 6:
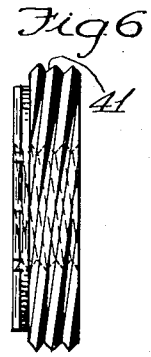
Fig. 6 is a side elevational view of the smaller nut.
Figure 7:
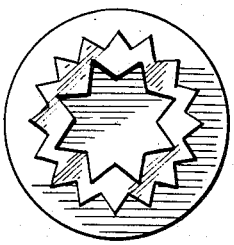
Fig. 7 is an end view of a wrench which has its end so formed that it fits in the depressions that are formed in the inner and outer nuts, so that this socket wrench holds the two nuts in a predetermined rotative position relative to each other.

Referring to Figs. 1 and 2, 10 and 11 indicate two members to be secured together by a bolt, and the lock nut assembly of the present invention.

These members may comprise a pair of metal plates provided with the through bores 12, 13, for receiving the shank 14 of the bolt 15, having a non-circular head 16.

While the bolt and the larger nut are shown with hexagonal exterior surfaces, they may obviously be made of any suitable non-circular shape for engagement with a wrench or other suitable tool, or they may even be circular when gripped by a pipe wrench.

The bolt shank 14 has a threaded end portion 17, provided with right-hand threads 18 in the present example, but I desire it to be understood that these may be left-hand threads provided the other threads of the assembly are changed accordingly.

The lock nut assembly preferably comprises a larger or outside nut 19, and a smaller or inside nut 20; and each of these nuts is preferably made up of a plurality of laminations, such as the laminations 21 of the outer nut and the laminations 22 of the inner nut.

These laminations are preferably made of sheet metal, such as sheet steel, but may be made of any suitable metal; and the laminations are integrally welded or brazed or sweated together to form the two nut units 19 and 20.

The outer nut 19 preferably has a non-circular outer surface 23, which may, for example, be hexagonal or any other suitable configuration to be gripped by a wrench as described above.

The outer nut is provided with a centrally located through bore 24, having right-hand threads 25 to be threaded on the threaded shank 17 of the bolt 15.

The outer nut also has a substantially circular counterbore 26 of larger size, forming a cavity for receiving the smaller nut, and the counterbore 26 is provided with left-hand threads 27.

This leaves an annular face 28 on the outside of the larger nut about the threads 27; and this annular face is preferably deformed by means of a punch press so that it has a plurality of V-shaped depressions 29, defined by the flat surface 30 in each case, and by two diagonal lines 31 and 32.

The V-shaped depressions on the outer face of the larger nut 19 also form this face with a plurality of inwardly extending V-shaped teeth 33, defined by the diagonal lines 31 and 32; and the V-shaped teeth and depressions 30 and 29 are preferably regularly spaced about the periphery of the counterbore 26.

In some embodiments of the invention the outer nut may be provided only with a single inwardly extending tooth, or a single outwardly extending depression, since this single tooth or single depression may cooperate with any of a plurality of these formations on the inner nut.

As long as the inner nut has a tooth to cooperate with another tooth on the outer nut, the assembly may be locked or unlocked. Having a plurality of teeth on one or both of the nuts makes it certain that they are available for operation no matter what position the nuts may take with respect to each other.

The right face 34 of the outer nut 19 may be plane for engaging the metal plate 10, and the bottom of the bore 26 may have a plane surface at 35 for engaging a similar plane surface 36 on the end of the inner nut 20.

The external surface 37 at the left end of the outer nut and the external surface 38 at the left end of the inner nut may be plane and flush with each other, aside from the depressions and teeth, some of which have already been described.

The inner nut 20 preferably comprises another laminated sheet metal member with the laminations integrally secured together as described, and provided with an internal bore 39, having right-hand threads 40, and of the same size as the bore 25, so that both these nuts

blanks with a small bore of the same size as said small bore in said first-mentioned blanks and with external cylindrical surfaces of a size commensurate with the inside of the larger bore, securing said latter blanks together integrally and threading the outside of the assembly in the same direction as the inside of the larger bore, threading the latter assembly into the larger bore to a tight condition, threading the registering smaller bores in the opposite sense, and stamping the inner and outer members simultaneously on the same end with a stamping formation which forms a plurality of inwardly extending teeth on the outer assembly and a plurality of outwardly extending teeth on the outer assembly to be engaged by a tool in twisting the inner assembly relative to the outer assembly to lock the nut.

References Cited in the file of this patent

UNITED STATES PATENTS

| | | |
|---|---|---|
| 327,743 | Uren | Oct. 6, 1885 |
| 2,696,236 | Curran | Dec. 7, 1954 |

FOREIGN PATENTS

| | | |
|---|---|---|
| 35,170 | Germany | Apr. 7, 1886 |
| 361,818 | Germany | Oct. 19, 1922 |